United States Patent
Aoki

(10) Patent No.: US 10,953,394 B2
(45) Date of Patent: Mar. 23, 2021

(54) HONEYCOMB STRUCTURE

(71) Applicant: NGK INSULATORS, LTD., Nagoya (JP)

(72) Inventor: Yoichi Aoki, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 105 days.

(21) Appl. No.: 15/926,132

(22) Filed: Mar. 20, 2018

(65) Prior Publication Data

US 2018/0280960 A1    Oct. 4, 2018

(30) Foreign Application Priority Data

Mar. 30, 2017    (JP) .............................. JP2017-068342

(51) Int. Cl.
*B01D 46/24*        (2006.01)
*B01J 35/04*        (2006.01)
(Continued)

(52) U.S. Cl.
CPC ............ *B01J 35/04* (2013.01); *B01D 46/247* (2013.01); *B01D 46/2429* (2013.01); *B01D 46/2474* (2013.01); *C04B 35/185* (2013.01); *C04B 35/195* (2013.01); *C04B 35/478* (2013.01); *C04B 35/565* (2013.01); *C04B 35/806* (2013.01); *C04B 38/0006* (2013.01);
(Continued)

(58) Field of Classification Search
None
See application file for complete search history.

(56) References Cited

U.S. PATENT DOCUMENTS 4,404,007 A * 9/1983 Tukao .............. B01D 39/2075
                                                   210/509
4,740,408 A * 4/1988 Mochida .............. B01D 46/10
                                                   422/179
(Continued)

FOREIGN PATENT DOCUMENTS

JP    S62-266298 A1    11/1987
JP    2013-056312 A    3/2013

OTHER PUBLICATIONS

Japanese Office Action (with English translation), Japanese Application No. 2017-068342, dated Sep. 15, 2020 (6 pages).
(Continued)

*Primary Examiner* — Humera N. Sheikh
*Assistant Examiner* — Mary I Omori
(74) *Attorney, Agent, or Firm* — Burr & Brown, PLLC

(57) ABSTRACT

A honeycomb structure, including: a honeycomb structure body having a porous partition walls which are disposed to define a plurality of cells and a circumferential wall, wherein the partition walls are provided with protrusions which protrude to extend into the cells and are continuously disposed in an extending direction of the cells, the cells have a polygonal shape in a cross section orthogonal to the extending direction of the cells, the plurality of cells include a plurality of specific cells having at least one place where two sides each of which is provided with a different number of protrusions intersect each other, and in the cross section orthogonal to the extending direction of the cells, disposition directions of the shapes of the cells including the protrusions in the specific cells are different in one specific cell and other specific cells other than the one specific cell.

4 Claims, 3 Drawing Sheets

(51) Int. Cl.
*F01N 3/10* (2006.01)
*C04B 35/185* (2006.01)
*C04B 35/478* (2006.01)
*C04B 35/80* (2006.01)
*C04B 38/00* (2006.01)
*C04B 35/195* (2006.01)
*C04B 35/565* (2006.01)
*F01N 3/28* (2006.01)

(52) U.S. Cl.
CPC ............ *C04B 38/0009* (2013.01); *F01N 3/10* (2013.01); *F01N 3/2828* (2013.01); *B01D 2046/2433* (2013.01); *B01D 2046/2481* (2013.01); *B01D 2046/2492* (2013.01); *C04B 2235/663* (2013.01); *F01N 2260/06* (2013.01); *F01N 2260/14* (2013.01); *F01N 2330/06* (2013.01); *F01N 2330/34* (2013.01); *F01N 2330/38* (2013.01); *F01N 2510/06* (2013.01)

(56) References Cited

U.S. PATENT DOCUMENTS

| | | | | |
|---|---|---|---|---|
| D837,356 S | * | 1/2019 | Kinoshita | D23/365 |
| D837,357 S | * | 1/2019 | Yamaguchi | D23/365 |
| D841,142 S | * | 2/2019 | Kinoshita | D23/365 |
| 2014/0154145 A1 | | 1/2014 | Aoki | |
| 2016/0160720 A1 | * | 6/2016 | Sadaoka | C04B 38/0006 55/523 |
| 2017/0065919 A1 | | 3/2017 | Yamanishi et al. | |

OTHER PUBLICATIONS

German Office Action, German Application No. 10 2018 002 331.2, dated Sep. 29, 2020 (6 pages).

English Translation of German Office Action, German Application No. 10 2018 002 331.2, dated Sep. 29, 2020 (3 pages).

\* cited by examiner

HONEYCOMB STRUCTURE

The present application is an application based on JP-2017-068342 filed on Mar. 3, 2017 with the Japan Patent Office, the entire contents of which are incorporated herein by reference.

BACKGROUND OF THE INVENTION

Field of the Invention

The present invention relates to a honeycomb structure. More particularly, the present invention relates to a honeycomb structure in which purification performance is improved when a flow rate of exhaust gas is large (high flow rate) and abrasion resistance is maintained.

Description of the Related Art

In recent years, awareness of environmental problems has been increasing in society as a whole. For this reason, in the field of technologies to burn fuel to generate power, various technologies for removing harmful components such as nitrogen oxides from the exhaust gas generated during combustion of fuel have been developed. As various technologies for removing the harmful components, for example, various technologies for removing harmful components such as nitrogen oxides have been developed from exhaust gas emitted from automobile engines. In removing the harmful components from the exhaust gas, it is common to cause a chemical reaction to the harmful components using a catalyst and convert the harmful components into another component which is relatively harmless. A honeycomb structure has been used as a catalyst carrier for loading the catalyst for the exhaust gas purification.

Conventionally, as the honeycomb structure, there has been proposed a honeycomb structure including a honeycomb structure body having porous partition walls defining a plurality of cells as fluid channels. As this honeycomb structure, there has been proposed a honeycomb structure provided with fins protruding inward from a partition wall to increase a geometric surface area of the partition wall (for example, see Patent Document 1).

CITATION LIST

Patent Document

[Patent Document 1] JP-A-62-266298

SUMMARY OF THE INVENTION

In the honeycomb structure of Patent Document 1, the geometric surface area of the partition wall can be increased by the fins disposed on the partition wall. However, in the honeycomb structure of Patent Document 1, a flow of the exhaust gas tends to be stagnated between two adjacent fins, which is, in particular, a factor of lowering contact property with the catalyst at the high flow rate (specifically, space velocity of about 8,300/hour or more). In particular, in the honeycomb structure of Patent Document 1, it is preferable that the same number of fins is disposed on each side configuring the cell. In this case, there is a problem in that the stagnation of the flow of the exhaust gas is very likely to occur and the purification performance cannot be suppressed from being lowered when the flow rate is large.

The present invention has been made considering the problems of the prior art. An object of the present invention is to provide a honeycomb structure in which purification performance is improved when a flow rate of exhaust gas is large and abrasion resistance is maintained, when a catalyst is loaded.

According to the present invention, a honeycomb structure shown below is provided.

According to a first aspect of the present invention, a honeycomb structure, including:

a pillar-shaped honeycomb structure body having porous partition walls which are disposed to define a plurality of cells as a fluid channel extending from a first end face to a second end face and a circumferential wall disposed to surround the partition walls, wherein the partition walls are provided with protrusions which protrude to extend into the cells and are continuously disposed in an extending direction of the cells, the cells have a polygonal shape in a cross section orthogonal to the extending direction of the cells, the plurality of cells include a plurality of specific cells having at least one place where two sides each of which is provided with a different number of protrusions intersect each other, and in the cross section orthogonal to the extending direction of the cells, disposition directions of the shapes of the cells including the protrusions in the specific cells are different in one specific cell and other specific cells other than the one specific cell.

According to a second aspect of the present invention, the honeycomb structure of the first aspect is provided, wherein in the specific cell, the number of protrusions disposed on each side is equal to or less than 3.

According to a third aspect of the present invention, the honeycomb structure of the first or second aspects is provided, wherein in the cross section orthogonal to the extending direction of the cells, the plurality of specific cells are arranged in one direction, and in the one direction, variation in the disposition direction of the shape of the cell including the protrusion has regularity.

According to a fourth aspect of the present invention, the honeycomb structure of the first or second aspects is provided, wherein in the cross section orthogonal to the extending direction of the cells, the plurality of specific cells are arranged in one direction, and in the one direction, variation in the disposition direction of the shape of the cell including the protrusions has irregularity.

Since the honeycomb structure of the present invention has the protrusions provided to protrude into the cells, the geometric surface area of the partition walls can be increased by the protrusion. In particular, the honeycomb structure of the present invention can hardly cause the stagnation of the flow of the exhaust gas even when the flow rate of the exhaust gas is large (at the high flow rate) and improve the purification performance when being used as the catalyst carrier. The honeycomb structure of the present invention maintains the abrasion resistance.

DESCRIPTION OF THE PREFERRED EMBODIMENTS

Embodiments of the present invention will now be described with reference to the accompanying drawings. The present invention is not limited to the following embodiments. Therefore, it should be understood that appropriate changes, improvements and the like of the following embodiments based on the ordinary knowledge of those skilled in the art fall within the scope of the present invention without deviating from the purposes of the present invention.

Figure 1:
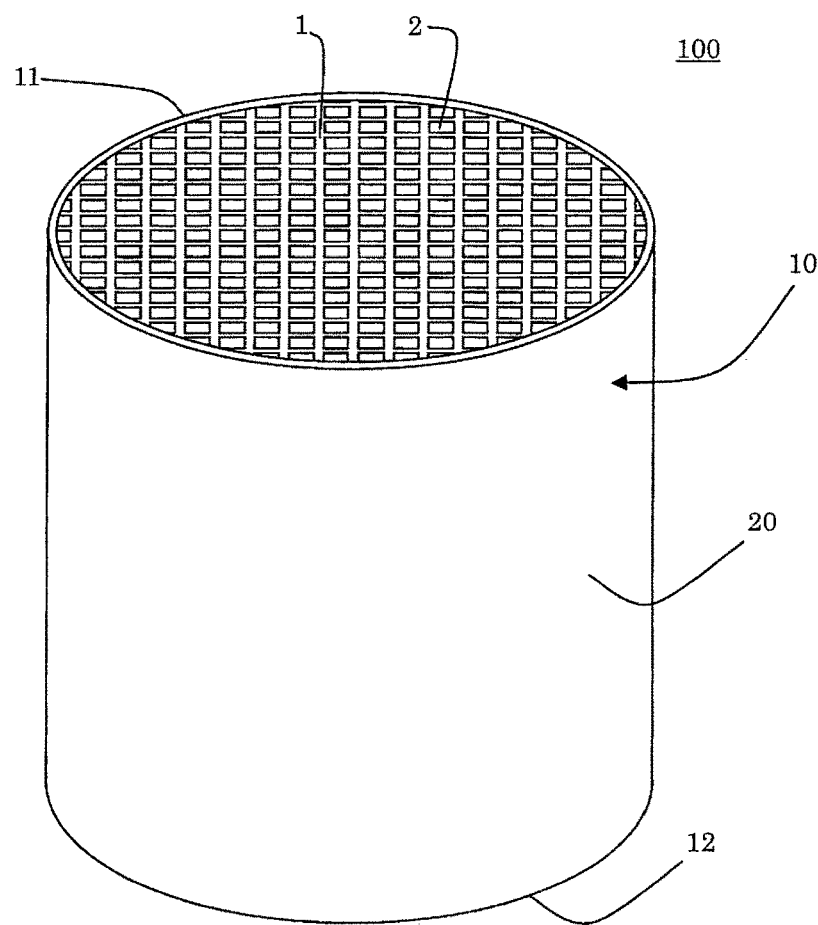
FIG. 1 is a perspective view schematically showing a honeycomb structure according to an embodiment of the present invention.
Figure 2:
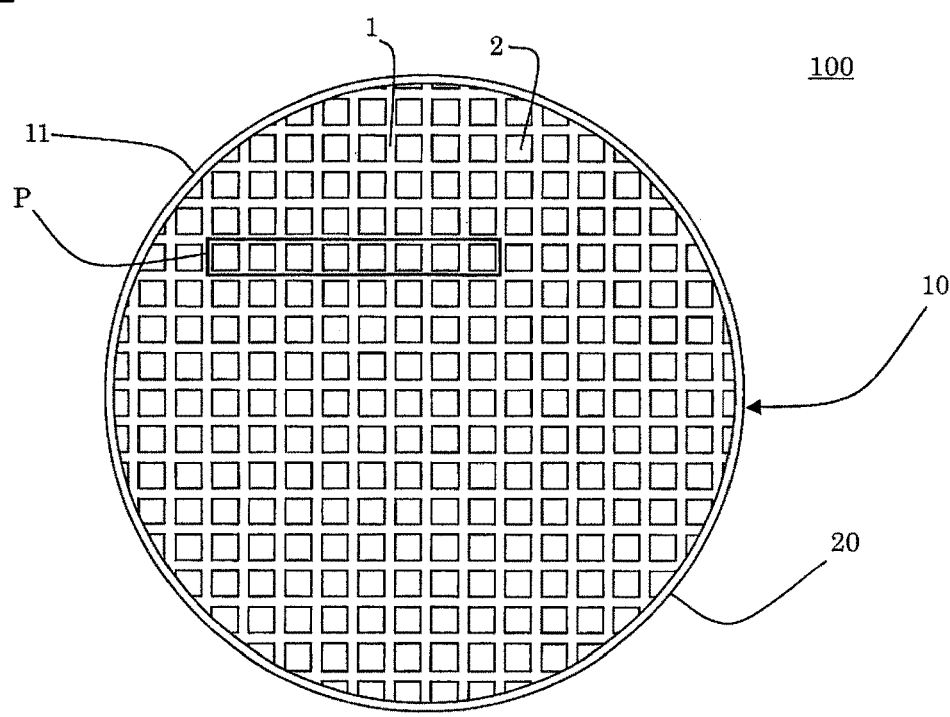
FIG. 2 is a plane view schematically showing an inflow end face in the honeycomb structure according to the embodiment of the present invention.
Figure 3:
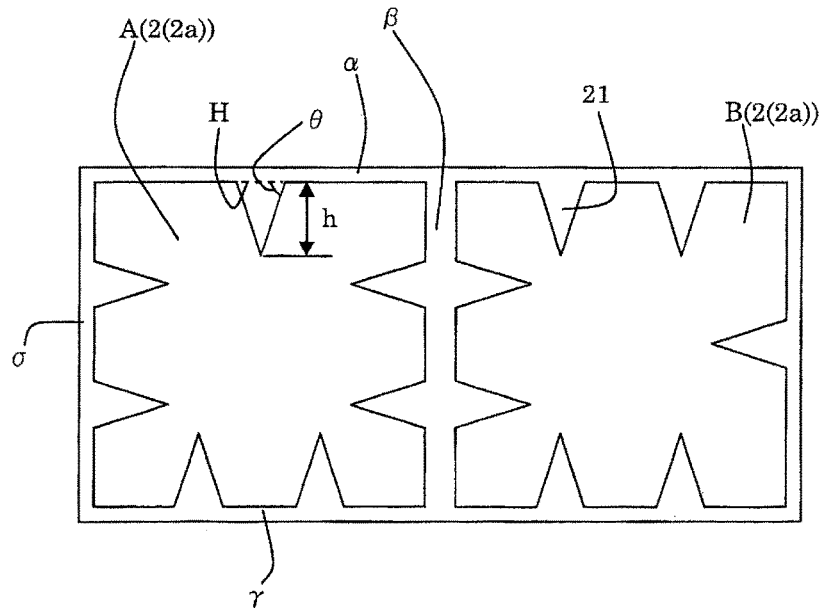
FIG. 3 is a plane view schematically showing an enlarged part of the inflow end face shown in FIG. 2.

(1) Honeycomb Structure:

A honeycomb structure according to an embodiment of the present invention is a honeycomb structure 100 as shown in FIGS. 1 to 3. The honeycomb structure 100 has a pillar-shaped honeycomb structure body 10. The honeycomb structure body 10 has porous partition walls 1 which are disposed to define a plurality of cells 2 as fluid channels extending from a first end face 11 to a second end face 12 and a circumferential wall 20 which is disposed to surround the partition walls 1. The partition walls 1 have protrusions 21 which protrude to extend into the cells 2 and are continuously disposed in an extending direction of the cells 2. In the honeycomb structure 100, the cells 2 have a polygonal shape in a cross section orthogonal to the extending direction of the cells 2. The plurality of cells 2 include a plurality of "specific cells 2a", each of which has at least one place where two sides each of which is provided with a different number of protrusions 21 intersect each other. Furthermore, in the honeycomb structure 100, one specific cell 2a and other specific cells 2a other than the one specific cell 2a are different in the cross section in which the disposition directions of shapes of cells including the protrusions 21 in the specific cell 2a are orthogonal to the extending direction of the cells 2.

Since the honeycomb structure 100 has the protrusions 21 provided to protrude into the cells 2, it is possible to increase the geometric surface area of the partition wall 1.

Figure 7:
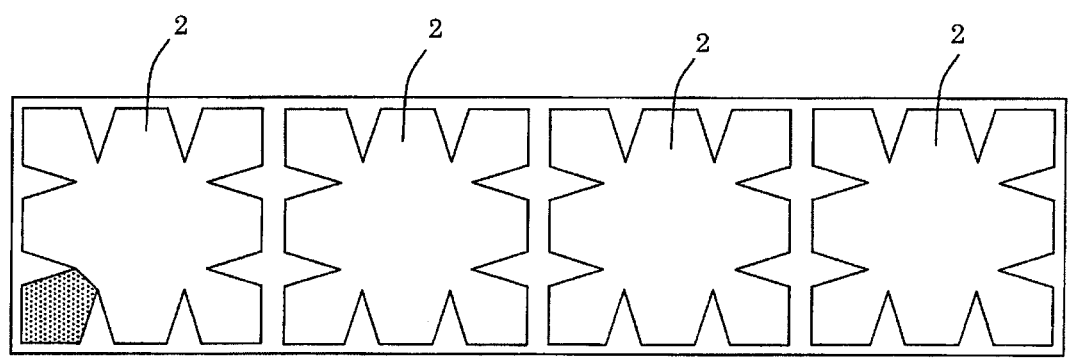
FIG. 7 is a plane view schematically showing an enlarged part of an inflow end face in the existing honeycomb structure.

In particular, the honeycomb structure 100 can hardly cause a stagnation of a flow of exhaust gas even at a high flow rate of exhaust gas and can improve purification performance when being used as a catalyst carrier. That is, the existing honeycomb structure provided with fins was a factor of facilitating the stagnation of the flow of the exhaust gas between the two protrusions 21 (corner parts as indicated by dots in FIG. 7) adjacent to each other and lowering contact property of the exhaust gas with the catalyst at the high flow rate (specifically, space velocity of about 8,300/hour or more). In this respect, since the protrusions 21 are disposed to satisfy the predetermined conditions, the honeycomb structure 100 hardly causes the stagnation of the flow of the exhaust gas even at the high flow rate of the exhaust gas as described above. As a result, the honeycomb structure 100 can improve the purification performance after the loading of the catalyst.

In the honeycomb structure 100, the disposition directions of shapes of the cells in the plurality of specific cells are different in one specific cell 2a and other specific cells 2a other than the one specific cell 2a. For this reason, the honeycomb structure 100 avoids a reduction in abrasion resistance as compared with the existing honeycomb structure provided with the fins (i.e., abrasion resistance is maintained).

(1-1) Partition Wall:

In the honeycomb structure 100, as described above, the partition walls 1 have the protrusions 21. For this reason, if the catalyst is loaded in the honeycomb structure 100, the honeycomb structure 100 increases a load area of the catalyst as many as the number of installed protrusions 21, as compared with the honeycomb structure without the protrusion 21. As a result, the contact property of the catalyst with the exhaust gas is improved, and the purification performance of the exhaust gas is improved.

The shape of the protrusion 21 is not particularly limited in the cross section orthogonal to the extending direction of the cells. For example, in the cross section orthogonal to the extending direction of the cells, the protrusion 21 can have a polygonal shape such as a triangular shape and a quadrangular shape, a semicircular shape and the like. Among these shapes, the protrusion 21 preferably has the triangular shape. If the protrusion 21 has the triangular shape, it is possible to suppress a pressure loss from increasing as compared with other shapes while securing the loading area of the catalyst (while securing substantially the same loading area as the case of other shapes) compared with other shapes.

When the protrusion 21 has the triangular shape in the cross section orthogonal to the extending direction of the cells (see FIG. 3), an angle of the protrusion is preferably 40 to 70°, more preferably 45 to 65°. If the angle of the protrusions are within the above range, it becomes difficult for the catalyst to be thickly accumulated at the base of the protrusions when the catalyst is applied to a surface of the partition walls (i.e., at the time of coating the catalyst). For this reason, it is possible to increase the surface area of the catalyst on the partition walls after the catalyst is applied to the surface of the partition walls (i.e., after the catalyst coating), and as a result, the purification performance of the exhaust gas is improved. If the angle is less than the lower limit value, in the case of making the height of the protrusions the same while changing the angle, a volume of the protrusions is increased. For this reason, there is a possibility that the pressure loss of the honeycomb structure is increased. If the angle exceeds the upper limit value, there is a possibility that a large amount of catalyst may be accumulated at the base of the protrusions at the time of coating the catalyst. In other words, the thick layer of the catalyst tends to be thickly formed at the base of the protrusions. For this reason, there is a possibility that the catalyst in the lower layer portion (portion close to the partition walls) of this catalyst layer is not effectively used. It should be noted that the angle of the protrusion is an angle corresponding to an acute angle among angles formed by the surface of the partition wall and a side surface of the protrusion. In addition, when the base of the protrusion has a chamfered shape, an angle formed by an extended line of a base line H (see FIG. 3) and extended lines of each side of the triangle excluding the base line H is set as an angle $\theta$. The "base of the protrusion has the chamfered shape" means a shape in which an apex at the base of the protrusion having a triangular cross section is cut away.

A ratio of a height of the protrusion 21 to a hydraulic diameter of the cell is preferably 4 to 40%, more preferably 4 to 30%. The height of each protrusion may be the same or may be different. It should be noted that the height of the protrusion 21 is a distance from the apex of the protrusion to the base line H (see FIG. 3). However, in the case in which the apex of the protrusion has the chamfered shape, an intersection between extended lines of two sides of the triangle excluding the base line H (see FIG. 3) is determined, and a shortest distance from the intersection to the base line H is set to be a height h. The "apex of the protrusion has the chamfered shape" means a shape in which a tip part of the protrusion having the triangular cross section is cut away. In addition, the hydraulic diameter of the cell is a value calculated by 4×(cross-sectional area)/(circumferential length) based on a cross-sectional area and a circumferential length of each cell. The cross-sectional area of the cell indicates an area of the shape (cross section shape) of the cell appearing in the cross section vertical to a central axis direction of the honeycomb structure, and the circumferential length of the cell indicates a length (length of closed line surrounding the cross section) around the cross section shape of the cell. If the ratio of the height of the protrusion to the hydraulic diameter of the cell is less than 4%, there is a possibility that the effect of increasing the geometric surface area due to the protrusions is not obtained and the purification performance is insufficient. In addition, if the ratio of the height of the protrusion to the hydraulic diameter of the cell exceeds 40%, there is a possibility that the increase in the pressure loss occurs.

The protrusion 21 is not particularly limited as long as there are a plurality of specific cells in the plurality of cells, and each of the partition walls configuring one cell can be provided with any number of protrusions. It should be noted that the number of protrusions 21 disposed on each partition wall can be specifically 1 to 3, preferably 3 or less. In other words, in the specific cell, the number of protrusions disposed on each side is preferably equal to or less than 3. By doing so, it is effective from the viewpoint that the exhaust gas more satisfactorily flows between the adjacent protrusions, the stagnation of the flow of the exhaust gas hardly occurs even at the high flow rate, and the purification performance is improved. In other words, if the number of protrusions 21 is equal to or more than 4, a gap between the adjacent protrusions tends to be too narrow and the pressure loss tends to be increased.

The position of the protrusion 21 can be appropriately determined without any particular limitation. For example, the position of the protrusion 21 can be set to be a position at which a side at which the protrusion 21 is disposed is equally divided. For example, FIG. 3 shows an example in which one protrusion 21 disposed on a first side α is disposed to bisect this first side α.

The thickness of the partition wall 1 is preferably 40 to 230 μm, more preferably 40 to 178 μm. If the thickness of the partition wall is less than the lower limit value, there is a possibility that mechanical strength may be insufficient. If the thickness of the partition wall exceeds the upper limit value, there is a possibility that the pressure loss of the honeycomb structure is increased. It should be noted that the thickness of the partition wall is a thickness of a part at which the protrusions are not disposed.

There is no particular limitation on a material of the partition walls 1. For example, it is preferable to use ceramic as a main component. Specifically, the material of the partition walls 1 is preferably at least one selected from the group consisting of silicon carbide, a silicon-silicon carbide based composite material, cordierite, mullite, alumina, aluminum titanate, silicon nitride, and silicon carbide-cordierite based composite material.

(1-2) Cell:

In the honeycomb structure of the present invention, the cells have the polygonal shape in the cross section orthogonal to the extending direction of the cells. The shape of the cells can be specifically a polygon such as a triangle, a quadrangle, a pentagon, a hexagon, and an octagon, a circle, or an ellipse, or a combination of the quadrangle, the hexagon, the octagon or the like. It should be noted that in this specification, the term "the shape of the cell is a polygon" is a concept that the shape of the cell is similar to a polygon.

In the honeycomb structure of the present invention, the plurality of cells include the plurality of specific cells. This specific cell is a cell having at least one place where "two sides each of which is provided with a different number of protrusions" intersect each other (hereinafter, there may be a case in which an "intersection part" is expressed). In the honeycomb structure of the present invention, the stagnation of the flow of the exhaust gas is prevented from occurring in the specific cells having the intersection part when the flow rate of the exhaust gas is large (at the high flow rate) and increases the contact property of the catalyst with the exhaust gas. As a result, the purification performance of the exhaust gas in the honeycomb structure (in particular, the honeycomb structure after the catalyst is loaded) is improved.

FIG. 3 shows a specific cell A which is a cell having a quadrangular cross section and a specific cell B adjacent to this specific cell A. In the specific cell A, one protrusion 21 is disposed on the first side α, two protrusions 21 are disposed on a second side β intersecting the first side α, and two protrusions 21 are also formed on a fourth side σ intersecting the first side α. This specific cell A has two intersection parts. Specifically, the intersection part has a part where the first side α and the second side β intersect each other, and a part where the first side α and the fourth side σ intersect each other. In addition, in the specific cell B, two protrusions 21 are disposed on the first side α, one protrusion 21 is disposed on the second side β intersecting the first side α, and two protrusions 21 are also formed on a third side γ intersecting the second side β. This specific cell B also has two intersection parts like the specific cell A. Specifically, the intersection part has a part where the first side α and the second side β intersect each other and a part where the second side β and the third side γ intersect each other.

It should be noted that in the present invention, the plurality of specific cells may be adjacent to each other having the partition wall therebetween as shown in FIG. 3 or may be positioned at a position where the specific cells are not adjacent to each other.

The ratio of the specific cells is not particularly limited as long as the honeycomb structure of the present invention includes the plurality of specific cells. For example, the ratio (value calculated by Formula: (the number of specific cells/the total number of cells)×100) of the specific cells in all cells is preferably 10% or more, more preferably 50% or more. The ratio of the specific cells in all the cells is within the above range, such that the better purification performance of the exhaust gas is exhibited in the honeycomb structure after the loading of the catalyst. If the ratio of the specific cells in all the cells is less than the lower limit value, there is a possibility that the purification performance of the exhaust gas may not be sufficiently improved and the purification performance may be insufficient.

In the honeycomb structure of the present invention, in the cross section orthogonal to the extending direction of the cells, the disposition directions of the shapes of the cells including the protrusions in the specific cells are different in one specific cell and other specific cells other than the one specific cell. By satisfying these conditions, it is possible to prevent erosion resistance from being lowered and avoid lowering the abrasion resistance, as compared with the existing honeycomb structure provided with the fins (i.e., the abrasion resistance is maintained). In other words, in the honeycomb structure of the present invention, it is possible to improve the purification performance of the exhaust gas by including the "specific cells having at least one intersection part" as described above. On the other hand, the intersection part of the specific cells may be a factor of lowering the abrasion resistance. This is because the number of fins is smaller and the strength of the partition walls tends to be lowered, as compared with the existing honeycomb structure provided with the fins. Thus, by satisfying the above conditions, it becomes possible to prevent the abrasion resistance of the whole honeycomb structure from being lowered. In other words, it is possible to avoid generating a direction in which the honeycomb structure is extremely weak against the erosion (i.e., the part in the specific direction is easily chipped on the end face of the honeycomb structure).

The "in the cross section orthogonal to the extending direction of the cells, the disposition directions of the shapes of the cells including the protrusions in the specific cells are different in one specific cell and other specific cells other than the one specific cell" means the following relationship in one specific cell (specific cell X) and other specific cells (specific cell Y). In other words, in the cross section orthogonal to the extending direction of the cells, an arbitrary specific cell X (cell having the quadrangular cross section) is observed with a profile projector, and on the profile projector, a side positioned on an upper side is set as the first side, a side positioned on a right side is set as the second side, a side positioned on a lower side is set as the third side, and a side positioned on a left side is set as the fourth side (e.g., see the "specific cell A" shown by symbol A in FIG. 3). The cell shape including the protrusions in the specific cell X drawn on the profile projector is set as the cell shape X. For any specific cell Y that is different from the specific cell X observed on the profile projector, the cell shape including the protrusions in the specific cell Y drawn on this profile projector is set as the cell shape Y. This means that the cell shape X and the cell shape Y are different. It should be noted that this also includes the case in which if a point of view looking at the specific cell is changed, one specific cell and other specific cells have the same cell shape and if the point of view is fixed, one specific cell and other specific cells have different cell shapes. In other words, for example, in FIG. 3, the specific cell A and the specific cell B adjacent to this specific cell A have the same cell shape (if the point of view looking at the specific cell is rotated by 90°, the specific cell A and the specific cell B have the same cell shape), whereas if the point of view is fixed, the cell shapes of the specific cell A and the specific cell B do not coincide with each other, which has the relationship that the disposition directions of the shapes of the cells including the protrusions in the specific cells are different.

It is preferable that in the cross section orthogonal to the extending direction of the cells, the plurality of specific cells are arranged in one direction and in the one direction, variations in the disposition directions of the shapes of the cells including the protrusions preferably have regularity. By doing so, it is possible to better prevent the abrasion resistance from deteriorating.

Figure 4:
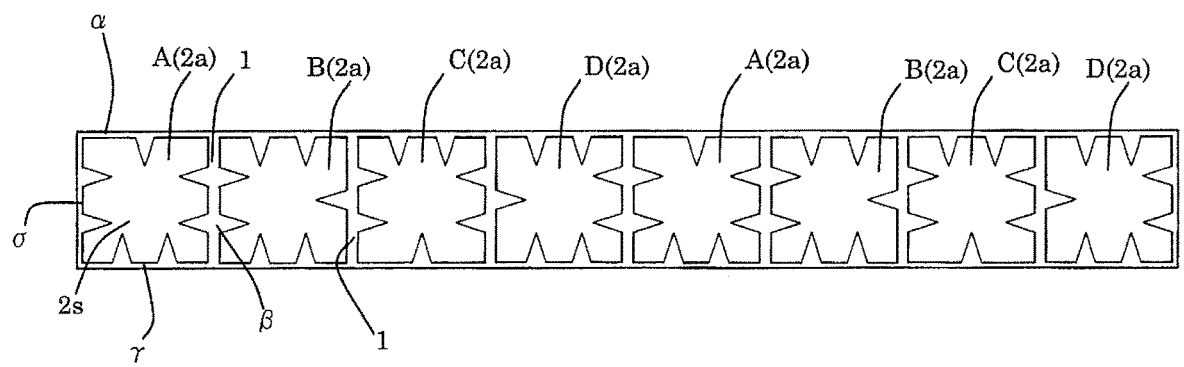
FIG. 4 is a plane view schematically showing an enlarged part (region P) of the inflow end face shown in FIG. 2.
Figure 5:
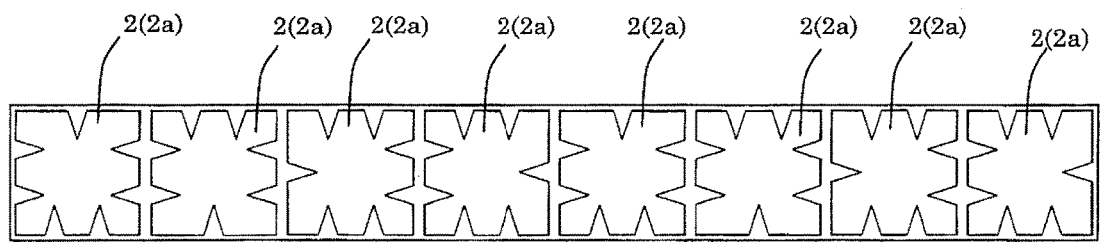
FIG. 5 is a plane view schematically showing an enlarged part of an inflow end face in a honeycomb structure according to another embodiment of the present invention.

"In one direction, variations in the disposition directions of the shapes of the cells including the protrusions have regularity" means that a specific cell group including a plurality of adjacent specific cells arranged in one direction continuously and repeatedly appears in the arrangement directions of the specific cells according to a certain rule. It should be noted that the rule is not particularly limited. For example, n (n is equal to or more than 2) adjacent specific cells arranged in one direction having the partition walls therebetween are referred to as "specific cell group" (FIGS. 4 and 5 show a specific cell group including four specific cells). At this time, there may be a case in which this specific cell group sequentially, continuously and repeatedly appears, or the like. The number of specific cells configuring the specific cell group is not limited to four as shown in FIGS. 4 and 5 but may be 2 or more.

For example, as shown in FIGS. 4 and 5, when the specific cells have 4-fold rotational symmetry, there are 4 disposition directions of the shapes of the cells including the protrusions in the specific cells (i.e., there are 4 variations). FIGS. 4 and 5 show an example in which the specific cell group including the specific cells of these 4 variations has the regularity that the specific cell group appears sequentially, continuously, and repeatedly. In this way, in the case in which the specific cell group including the specific cells which have the 4-fold rotational symmetry and 4 variations has the regularity that the specific cell group appears continuously and repeatedly, the erosion resistance is maintained and the deterioration in the abrasion resistance can be prevented more satisfactorily.

FIG. 4 shows an example in which 4 specific cells 2a are arranged in one direction (adjacent to each other having the partition wall 1 therebetween) and the specific cells 2a adjacent to each other have a shape of a cell in which the specific cells 2a are disposed in the same direction if one of the specific cells 2a adjacent to each other is rotated by 90°. That is, the specific cell 2a has the shape of the cell obtained by rotating the specific cell 2a clockwise by 90° as it is shifted to the right side.

Although the cells having the quadrangular cross section are described with reference to FIGS. 4 and 5, the same goes for cells having the polygonal cross section such as a hexagon.

In addition, it is preferable that in the cross section orthogonal to the extending direction of the cells, the plurality of specific cells are arranged in one direction and in the one direction, the variations in the disposition directions of the shapes of the cells including the protrusions have irregularity. Even in this case, it is possible to avoid the deterioration in the erosion resistance (i.e., abrasion resistance) and prevent only a part in a specific direction from being easily chipped.

"In one direction, the variations in the disposition directions of the shapes of the cells including the protrusions have irregularity" means that the plurality of specific cells arranged in one direction appear without any regularity (disorderly) along the arrangement direction.

Figure 6:
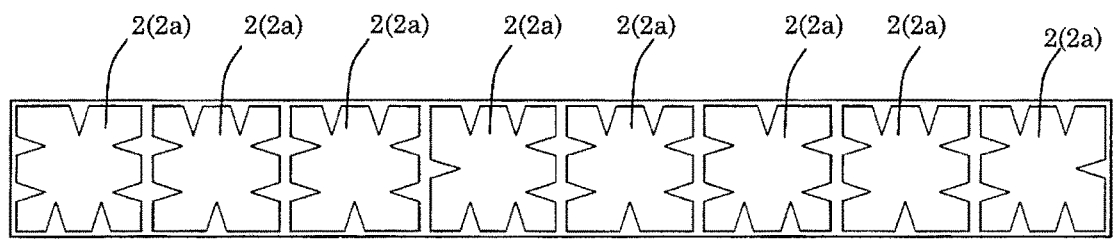
FIG. 6 is a plane view schematically showing an enlarged part of an inflow end face in a honeycomb structure according to still another embodiment of the present invention.

FIG. 6 shows 8 specific cells 2a adjacent to each other and arranged in one direction having the partition wall 1 therebetween. Since these specific cells 2a appear without any regularity along the arrangement direction, these specific cells are arranged irregularly (randomly) without regularity unlike the case shown in FIGS. 4 and 5.

In the honeycomb structure of the present invention, for each side of a cell having a polygonal (n-angular) sectional shape, any one of the plurality of specific cells is set as a reference cell. Here, for the reference cell, names from a first side to an n-th side are given. Next, for the specific cell other than the reference cell, each side parallel to each side (the first side to the n-th side) of the reference cell is given the same name. In this case, when average values of the number of protrusions disposed on the first side to the n-th side are calculated, it is preferable that a difference between a maximum value and a minimum value of the average values is less than 1.

For example, in FIG. 4, the specific cell $2a$ on the leftmost side is set as a reference cell $2s$. In this case, names are given from the first side $\alpha$ to the fourth side $\sigma$ on the reference cell $2s$. Next, for other specific cells, names are given from the first side $\alpha$ to the fourth side $\sigma$. In this case, the average value of the number of protrusions 21 disposed on the first side $\alpha$ is 1.75. The average value of the number of protrusions 21 disposed on the second side $\beta$ is 1.75. The average value of the number of protrusions 21 disposed on the third side $\gamma$ is 1.75. The average value of the number of protrusions 21 disposed on the fourth side $\sigma$ is 1.75. The difference (1.75−1.75) between the maximum value and the minimum value of the average value is 0.

(1-3) Circumferential Wall:

The circumferential wall 20 is a wall disposed to surround the partition walls 1. The circumferential wall 20 may be integrally formed with the partition walls 1.

The thickness of the circumferential wall 20 is preferably 0.1 to 6.0 mm, particularly preferably 0.1 to 3.0 mm. If the thickness of the circumferential wall 20 is less than the lower limit value, the mechanical strength may be lowered. If the thickness of the circumferential wall 20 exceeds the upper limit value, it may be necessary to secure a large space to accommodate the honeycomb structure.

The cell density of the honeycomb structure 100 is preferably 31 to 155 cells/cm$^2$, particularly preferably 43 to 148 cells/cm$^2$. If the cell density is less than the lower limit value, there is a possibility that the strength is not maintained. If the cell density exceeds the upper limit value, there is a possibility that the pressure loss of the honeycomb structure is increased.

(2) Method for Manufacturing Honeycomb Structure:

The honeycomb structure of the present invention can be manufactured by a method including a honeycomb forming process and a firing process. Each process is described below.

(2-1) Honeycomb Forming Process:

In this process, a ceramic forming raw material containing a ceramic raw material is formed to form a honeycomb formed body having the partition walls disposed to define a plurality of cells as a fluid channel.

As the ceramic raw material contained in the ceramic forming raw material, at least one selected from the group consisting of a cordierite forming raw material, cordierite, silicon carbide, silicon-silicon carbide based composite material, mullite, aluminum titanate is preferable. It should be noted that the cordierite forming raw material is a ceramic raw material blended to have a chemical composition having a range of 42 to 56 mass % of silica, 30 to 45 mass % of alumina and 12 to 16 mass % of magnesia. The cordierite forming raw material is fired to become the cordierite.

In addition, the ceramic forming raw material can be prepared by mixing a dispersing medium, an organic binder, an inorganic binder, a pore former, a surfactant and the like with the above ceramic raw material. The composition ratio of each raw material is not particularly limited, and therefore it is preferable to set a composition ratio according to the structure, material and the like of the honeycomb structure to be manufactured.

When the ceramic forming raw material is formed, first, the ceramic forming raw material is kneaded to obtain a kneaded material, and the obtained kneaded material is formed into the honeycomb shape. Examples of a method of kneading a ceramic forming raw material to form a kneaded material can include a method using a kneader, a vacuum pugmill and the like. Examples of a method for forming a honeycomb formed body by forming a kneaded material can include the known forming methods such as extrusion and injection molding.

Specifically, a method for forming a honeycomb formed body by performing extrusion using a die, and the like can be a preferable example. As a material of the die, cemented carbide which is hard to be worn is preferable.

It is preferable to use the die manufactured in the following manner. In other words, first, the die (conventional type die) used for manufacturing the conventionally known honeycomb structure without fins is prepared. Thereafter, regions complementary to the protrusions (regions in which the protrusions are formed by penetrations of the kneaded material) are formed by performing electric discharge machining from slits (gap for forming the partition walls) of the conventional die toward the outside. In this manner, a predetermined die can be manufactured.

The honeycomb formed body having the protrusions satisfying the conditions of the honeycomb structure of the present invention can be conveniently manufactured by using the die.

The shape of the honeycomb formed body is not particularly limited, and therefore examples of the shape of the honeycomb may include a round pillar shape, an elliptical pillar shape, and a polygonal prismatic columnar shape having an end face of "square, rectangle, triangle, pentagon, hexagon, octagon and the like".

In addition, the obtained honeycomb formed body can be dried after the above-mentioned forming. The drying method is not particularly limited. Examples of the drying method may include hot air drying, microwave drying, dielectric drying, reduced pressure drying, vacuum drying, freeze drying and the like. Among those, it is preferable to perform the dielectric drying, the microwave drying, or the hot air drying alone or in combination.

(2-2) Firing Process:

Next, the honeycomb formed body is fired to manufacture the honeycomb fired body. The firing (main firing) of the honeycomb formed body sinters the forming raw material configuring the calcinated honeycomb formed body to densify the forming raw material and is performed to secure a predetermined strength. Since the firing conditions (temperature, time, atmosphere and the like) vary depending on the kind of forming raw materials, it is necessary to select an appropriate condition according to the kind of forming raw materials. For example, in the case of using the cordierite forming raw material, the firing temperature is preferably 1410 to 1440° C. In addition, the firing time is preferably 4 to 8 hours as a keep time at a maximum temperature. Examples of an apparatus for performing calcination and main firing may include an electric furnace, a gas furnace and the like. The honeycomb fired body thus obtained can be used as the honeycomb structure of the present invention. The method for manufacturing a honeycomb structure may further include a circumference coat process as shown below.

(2-3) Circumference Coat Process:

In the process, the circumference of the obtained honeycomb fired body is applied with a circumference coat material to form the circumferential wall. It should be noted that the circumferential wall may be formed to be integrated with the partition walls at the time of manufacturing the honeycomb formed body. It is possible to prevent the honeycomb structure from being chipped when an external force is applied to the honeycomb structure by further forming the circumferential wall by the circumference coat process.

Examples of the circumference coat material may include those obtained by adding water to those, which are obtained by adding additives such as an organic binder, a foamable resin, and a dispersing agent to inorganic raw materials such as an inorganic fiber, colloidal silica, clay, and SiC particles, and kneading them. Examples of the method for applying a circumference coat material may include a method for coating a "cut honeycomb fired body" using a rubber spatula or the like while rotating the "cut honeycomb fired body" on a spinning lathe.

EXAMPLES

Hereinafter, the present invention is specifically described based on examples, but the present invention is not limited to these examples.

Example 1

In Example 1, first, the forming raw material for manufacturing the honeycomb structure was prepared. Specifically, the forming raw material was prepared by adding a binder, a surfactant, a pore former, and water to a ceramic raw material. As the ceramic raw material, kaolin, talc, and alumina which are the cordierite forming raw material was used.

Next, the obtained forming raw material was kneaded with the kneader and then pug-milled in the vacuum pugmill to form the kneaded material. Next, the obtained kneaded material was extruded using the die to manufacture the honeycomb formed body. The die used the fact that the variations in the disposition directions of the shapes of the cells including the protrusions become "the shape of cell of one specific cell is the 4-fold rotational symmetry of the shapes of the cells of other specific cells adjacent to one specific cell" as shown in FIG. 4. In the honeycomb formed body, after the firing, the thickness of the partition wall becomes 3.5 mil (0.089 mm) and the cell density becomes 400 cells/inch$^2$ (62 cells/cm$^2$). The shapes of the cells of the honeycomb formed body become a quadrangle. The honeycomb formed body becomes a round pillar shape. A diameter of the end faces of each of the round pillar-shaped honeycomb formed body becomes 118.4 mm after the firing. It should be noted that the above-mentioned die was designed so that the manufactured honeycomb structure satisfies each condition shown in the following Tables 1 and 3.

Next, the honeycomb dried body was obtained by drying the honeycomb formed body. Regarding the drying, the dielectric drying was first performed, and then the hot air drying was performed at the temperature of hot air of 120° C. for 2 hours. Next, both end portions of the honeycomb dried body were cut.

Next, the obtained honeycomb dried body was degreased. The degreasing was performed at 450° C. for 5 hours. Next, the honeycomb fired body was obtained by firing the degreased honeycomb dried body. The firing was performed at 1425° C. for 7 hours in the atmosphere. The temperature was raised to 1200 to 1425° C. for 5 hours. In this way, the honeycomb structure of Example 1 was manufactured.

An angle θ of the protrusion was 45° in the cross section orthogonal to the extending direction of the cells of the honeycomb structure of Example 1. In addition, a height h of the protrusion was 0.14 mm. In addition, in the cross section orthogonal to the extending direction of the cells, the protrusions were disposed on each side as shown in the following Table 1. In other words, as shown in FIG. 4, the variations in the disposition directions of the shapes of the cells including the protrusions had the regularity "the shape of the cell of one specific cell becomes the 4-fold rotational symmetry of the shapes of the cells of other specific cells adjacent to one specific cell". The obtained honeycomb structure was the same as the inverted shape of the die.

The angle θ of the protrusion and the height h of the protrusion were measured using the profile projector (manufactured by Mitutoyo Co.) and image analysis software (manufactured by Mitutoyo Co.). In addition, the position of the protrusion on the side was confirmed. Specifically, the measurement and confirmation were performed by first photographing the end face of the honeycomb structure using the profile projector to obtain an image, binarizing the image, and then using the measurement function of the image analysis software.

Further, the ratio of the specific cells to all the cells was 100%. The ratio of the specific cells to all the cells was calculated by measuring the total number of cells in the honeycomb structure and the total number of specific cells.

In addition, the average value of the number of protrusions disposed on the first side of the specific cell was 1.75. The average value of the number of protrusions disposed on the second side was 1.75. The average value of the number of protrusions disposed on the third side was 1.75. The average value of the number of protrusions disposed on the fourth side was 1.75. The difference between the maximum value and the minimum value of the average value was 0. It should be noted that in the "4 cells with the 4-fold rotational symmetry (see FIGS. 4 and 5)", a shape of a cell of a specific cell B adjacent to a specific cell A positioned at the leftmost side in FIG. 4 was a shape obtained by rotating the specific cell A by 90°. A shape of a cell of a specific cell C adjacent to the specific cell B is a shape obtained by rotating the specific cell B by 90°. In addition, a shape of a cell of a specific cell D adjacent to the specific cell C is a shape obtained by rotating the specific cell C by 90°.

In the honeycomb structure of Example 1, the thickness (mm) of the partition wall, the porosity (%) of the partition walls, and the cell density (cell/cm$^2$) were measured by the following method. The thickness (mm) of the partition wall and the cell density (cell/cm$^2$) were measured by the profile projector and the image analysis software, and the porosity (%) of the partition walls was measured by a mercury porosimetry. The results are shown in the following Tables 1 and 3. In the following Tables 1 and 3, the "porosity (%) of the partition walls" is represented by the "porosity (%)".

TABLE 1

| | Thickness of partition wall [mm] | Cell density [cell/inch²] | Cell density [cell/cm²] | Porosity [%] | The number of protrusions number | | | | Angle of protrusion [°] | Cell shape | Variation in disposition direction | Ratio of specific cell (%) |
|---|---|---|---|---|---|---|---|---|---|---|---|---|
| | | | | | Side 1 | Side 2 | Side 3 | Side 4 | | | | |
| Comparative Example 1 | 3.5 | 400 | 62 | 35 | 2 | 2 | 2 | 2 | 45 | Quadrangle | Same | 0 |
| Comparative Example 2 | 3.5 | 400 | 62 | 35 | 1 | 2 | 2 | 2 | 45 | Quadrangle | Same | 100 |
| Example 1 | 3.5 | 400 | 62 | 35 | 1 | 2 | 2 | 2 | 45 | Quadrangle | Change by 90° | 100 |
| Example 2 | 3.5 | 400 | 62 | 35 | 1 | 2 | 2 | 2 | 45 | Quadrangle | Irregular | 100 |
| Example 3 | 3.5 | 400 | 62 | 35 | 1 | 2 | 1 | 2 | 45 | Quadrangle | Irregular | 100 |
| Comparative Example 3 | 3.5 | 400 | 62 | 35 | 3 | 3 | 3 | 3 | 45 | Quadrangle | Same | 0 |
| Comparative Example 4 | 3.5 | 400 | 62 | 35 | 2 | 3 | 3 | 3 | 45 | Quadrangle | Same | 100 |
| Example 4 | 3.5 | 400 | 62 | 35 | 2 | 3 | 3 | 3 | 45 | Quadrangle | Change by 90° | 100 |
| Example 5 | 3.5 | 400 | 62 | 35 | 2 | 3 | 3 | 3 | 45 | Quadrangle | Irregular | 100 |
| Example 6 | 3.5 | 400 | 62 | 35 | 2 | 3 | 2 | 3 | 45 | Quadrangle | Irregular | 100 |
| Example 7 | 3.5 | 400 | 62 | 35 | 1 | 2 | 2 | 2 | 45 | Quadrangle | Change by 90° | 10 |
| Example 8 | 3.5 | 400 | 62 | 35 | 1 | 2 | 2 | 2 | 45 | Quadrangle | Change by 90° | 50 |
| Comparative Example 5 | 3.5 | 400 | 62 | 35 | 4 | 4 | 4 | 4 | 45 | Quadrangle | Change by 90° | 100 |
| Example 9 | 3.5 | 400 | 62 | 35 | 1 | 2 | 2 | 2 | 40 | Quadrangle | Change by 90° | 100 |
| Example 10 | 3.5 | 400 | 62 | 35 | 1 | 2 | 2 | 2 | 65 | Quadrangle | Change by 90° | 100 |
| Example 11 | 3.5 | 400 | 62 | 35 | 1 | 2 | 2 | 2 | 70 | Quadrangle | Change by 90° | 100 |
| Example 12 | 3.5 | 400 | 62 | 35 | 1 | 2 | 2 | 2 | 30 | Quadrangle | Change by 90° | 100 |
| Example 13 | 3.5 | 400 | 62 | 35 | 1 | 2 | 2 | 2 | 80 | Quadrangle | Change by 90° | 100 |

In the above Table 1, the "change by 90°" in the column of the "variations in disposition directions" means a shape of a cell obtained by sequentially rotating the specific cells A to D, which are 4 cells of the 4-fold rotational symmetry, by 90° as shown in FIG. 4. In the following Table 3, the "change by 60°" in the column of "variations in disposition directions" means a shape of a cell obtained by sequentially rotating the specific cells which are 6 cells of 6-fold rotational symmetry, by 60°. In addition, as shown in FIG. 6, the "irregular" in the column of the "variations in disposition directions" means that the plurality of specific cells are arranged in one direction and in the one direction, the variations in the disposition directions of the shapes of the cells including the protrusions are irregular. In addition, the "same" in the column of the "variations in disposition directions" means that all the disposition directions of the shapes of the cells including the protrusions are the same. That is, it means that although the specific cells exist, there are no variations in the disposition directions of the specific cells and all the disposition directions are the same (e.g., only the specific cell A in FIG. 3 exists). In other words, it means that the disposition directions of the shapes of the cells including the protrusions in the specific cells are the same in one specific cell and other specific cells other than the one specific cell.

In addition, the column of "the number of protrusions" in the above Table 1 indicates the number of protrusions disposed on each of the four sides (the first side α to the fourth side σ (see FIG. 4)) of the quadrangular cell. Similarly, the column of "the number of protrusions" in the following Table 3 indicates the number of protrusions disposed on each of the six sides of the hexagonal cell (the first side to the sixth side (referred to as side 1 to side 6 in the following Table 4)). It should be noted that in the column of "the number of protrusions", the variations in the disposition directions of the cells are not considered. In other words, for example, in Example 1, there are the specific cells A to D as the variations in the disposition directions of the cells. However, since in the column of "the number of protrusions", the variations in the disposition directions of the cells are not considered, the first side (side 1) is indicated as "1", and the second side to the fourth side (side 2 to side 4) are indicated as "2".

(LA-4 Test)

For the manufactured honeycomb structure, a test was performed as follows based on the LA-4 mode of Federal Test Procedure in the United States. First, 200 g/L of catalyst (three-way catalyst) was loaded on the partition walls of the honeycomb structure. The honeycomb structure in which the catalyst is loaded was subjected to aging treatment at 950° C. for 12 hours by using an electric furnace. Next, the LA-4 test was performed while the honeycomb structure in which the catalyst is loaded is mounted on an underfloor position of a vehicle with the displacement of 2400 cc. In the LA-4 test, a direct modal mass for each gas component was measured using an exhaust gas measurement device (model number "MEXA-7400" manufactured by HORIBA Co.). In addition, an emission amount of HC as the representative exhaust gas component was measured. In addition, a space velocity of the exhaust gas by the test was about 10000/hour (high flow rate).

In addition, in the honeycomb structure in which the partition walls have the protrusions, in particular, an emission amount of exhaust gas of a second peak from acceleration becomes large. For this reason, a ratio of a modal mass integrated value at the time of an acceleration start of the second peak and a modal mass integrated value at the time of an acceleration end of the second peak was calculated to obtain an HC emission increment (%) before and after the second peak from the acceleration. The results are shown in the following Tables 2 and 4. It should be noted that in the following Tables 2 and 4, "the HC emission increment before and after the second peak from the acceleration" is written as the "HC emission increment".

TABLE 2

|  | HC emission increment [%] | Determination on LA-4 test | Erosion chipping amount [cc] | Erosion deterioration rate for each reference structure | Determination on erosion test | Pressure loss [kPa] | Ratio of pressure loss for each reference structure | Evaluation on pressure loss | Overall determination |
|---|---|---|---|---|---|---|---|---|---|
| Comparative Example 1 | 35 | Not acceptable | 1.50 | Reference structure 1 | — | 1.74 | Reference structure 1 | — | — |
| Comparative Example 2 | 30 | Good | 1.80 | 1.20 | NG | 1.70 | 0.98 | OK | Not acceptable |
| Example 1 | 31 | Good | 1.60 | 1.07 | OK | 1.70 | 0.98 | OK | Good |
| Example 2 | 30 | Good | 1.60 | 1.07 | OK | 1.70 | 0.98 | OK | Good |
| Example 3 | 28 | Good | 1.60 | 1.07 | OK | 1.66 | 0.95 | OK | Good |
| Comparative Example 3 | 37 | Not acceptable | 1.20 | Reference structure 2 | — | 1.90 | Reference structure 2 | — | — |
| Comparative Example 4 | 32 | Good | 1.50 | 1.25 | NG | 1.86 | 0.98 | OK | Not acceptable |
| Example 4 | 32 | Good | 1.30 | 1.08 | OK | 1.86 | 0.98 | OK | Good |
| Example 5 | 33 | Good | 1.30 | 1.08 | OK | 1.86 | 0.98 | OK | Good |
| Example 6 | 30 | Good | 1.40 | 1.17 | OK | 1.82 | 0.96 | OK | Good |
| Example 7 | 34 | Good | 1.58 | 1.05 | OK | 1.70 | 0.89 | OK | Good |
| Example 8 | 32 | Good | 1.52 | 1.01 | OK | 1.68 | 0.88 | OK | Good |
| Comparative Example 5 | 40 | Not acceptable | 0.9 | Reference structure 3 | OK | 2.06 | Reference structure 3 | — | — |
| Example 9 | 28 | Good | 1.55 | 1.03 | OK | 1.78 | 0.86 | OK | Good |
| Example 10 | 33 | Good | 1.65 | 1.10 | OK | 1.58 | 0.77 | OK | Good |
| Example 11 | 34 | Good | 1.7 | 1.13 | OK | 1.53 | 0.74 | OK | Good |
| Example 12 | 27 | Good | 1.5 | 1.00 | OK | 1.95 | 0.95 | OK | Good |
| Example 13 | 34 | Good | 1.77 | 1.18 | OK | 1.45 | 0.70 | OK | Good |

(Determination on LA-4 Test)

Compared with the honeycomb structure in which the partition walls do not have the protrusions, the honeycomb structure in which the partition walls have the protrusions is advantageous in Bag emission, and therefore the HC emission increment (%) before and after the second peak from the acceleration needs to be equal to or less than 35%. For this reason, the determination on the LA-4 test was made based on the following criteria.

Determination "Good": The case in which the HC emission increment is equal to or less than 35% is "good".

Determination "Not acceptable": The case in which the HC emission increment exceeds 35% is "not acceptable".

(Erosion Test)

First, the "bulk density before test" was obtained from the dry mass and the volume of the honeycomb structure. It should be noted that the dry mass refers to the mass of the honeycomb structure which is subjected to hot air drying at the temperature of hot air of 120° C. for 2 hours. Next, the honeycomb structure was wound with an alumina mat, inserted into a metallic storage container and then attached to a tip of a burner test apparatus in which LP gas was burned. Next, the gas temperature of the burner test apparatus was set to be 700° C. and the flow rate was controlled so that a flow velocity of gas in the vicinity of the end face on the burner side of the honeycomb structure was 270 m/sec. In addition, an inflow angle of gas with respect to the end face on the burner side of the honeycomb structure was set to be 45°. Next, the erosion test was performed by throwing 1 g of SiC abrasive grain every 1 minute, 15 g of SiC abrasive grain in total, with the SIC abrasive grain having an average particle size of 50 µm from the end face on the burner side of the honeycomb structure. The dry mass of the honeycomb structure after the erosion test was measured. In addition, the volume chipped by the erosion test was calculated based on the difference between the bulk density before the test and the dry mass of the honeycomb structure before and after the erosion test, which was referred to as an erosion chipping amount (cc). The results are shown in the above Table 2 and the following Table 4.

(Determination on Erosion Test)

First, in the cross section orthogonal to the extending direction of the cells, the honeycomb structures in which the same number of protrusions is disposed on all the sides of the cells at equal intervals were each defined as reference structures 1 to 4. That is, Comparative Example 1 in which the cell shape is a quadrangle and the protrusions are disposed on all the sides of the cells by two, Comparative Example 3 in which the cell shape is a quadrangle and the protrusions are disposed on all the sides of the cells by three, Comparative Example 5 in which the cell shape is a quadrangle and the protrusions are disposed on all the sides of the cells by four, and Comparative Example 6 in which the cell shape is a hexagon and the protrusions are disposed on all the sides of the cells by two were each defined as the reference structures 1 to 4.

Next, the erosion chipping amounts (cc) of Examples 1 to 3 and Comparative Example 2 with respect to the erosion chipping amount (cc) of the reference structure 1 were obtained. The values of these ratios (the erosion chipping amount (cc) of Examples 1 to 3 and Comparative Example 2, respectively/the erosion chipping amount (cc) of the reference structure 1) were defined as the erosion deterioration rate with respect to the reference structure 1. Similarly, the erosion deterioration rate of Examples 4 to 8 and Comparative Example 4 with respect to the reference structure 2, the erosion deterioration rate of Examples 9 to 13 and with respect to the reference structure 3, and the erosion deterioration rate of Examples 14 to 18 and Comparative Example 7 with respect to the reference structure 4 were obtained. Here, when the honeycomb structure was used as a carrier for the exhaust gas purification catalyst, if the erosion deterioration rate is less than 1.20, the honeycomb can be suitably used without lowering the purification performance. For this reason, the determination on the erosion test was performed based on the following criteria.

Determination "OK": The case in which the erosion deterioration rate is less than 1.20 is determined as "OK".

Determination "NG": The case in which the erosion deterioration rate is equal to or more than 1.20 is determined as "NG".

(Pressure Loss)

For the manufactured honeycomb structure, the pressure loss was measured by a large wind tunnel test machine. At this time, the gas temperature was set to be 25° C. and the gas flow rate was set to be 10 Nm³/min. The evaluation criteria were as follows: The ratio (Formula: value calculated by the pressure loss of the honeycomb structure of Example or Comparative Example/pressure loss of the reference structure) of the pressure loss to each reference structure was obtained, and the case in which the value is equal to or less than 1.20 is determined as "OK" and the case in which the value exceeds 1.20 is determined as "NG".

(Overall Determination)

Based on the determination on the LA-4 test, the determination on the erosion test, and the evaluation on the pressure loss, the overall determination was performed according to the following criteria.

Determination "good": The case in which the determination on the LA-4 test is "good", the determination on the erosion test is "OK", and the evaluation on the pressure loss is "OK" is determined as "good".

Determination "Not acceptable": The case in which there is "Not acceptable" or "NG" in the determination on the LA-4 test, the determination on the erosion test, or the evaluation on the pressure loss is determined as "not acceptable".

Examples 2 to 18, Comparative Examples 1 to 7

As shown in the above Table 1 and the following Table 3, the honeycomb structure was manufactured in the same manner as in Example 1 except that it was manufactured to have a predetermined number of protrusions and the variations in the disposition directions of the shapes of the cells including the protrusions.

Even for the honeycomb structures of Examples 2 to 18 and Comparative Examples 1 to 7, the thickness (mm) of the partition wall, the porosity (%) of the partition walls, and the cell density (cell/cm²) were measured in the same manner as in Example 1, and the LA-4 test, the erosion test and the evaluation on the pressure loss were performed. The results are shown in the above Tables 1 and 2 and the following Tables 3 and 4.

TABLE 3

| | Thickness of partition wall [mm] | Cell density [cell/inch²] | Cell density [cell/cm²] | Porosity [%] | The number of protrusions [number] | | | | | | Cell shape | Variation in disposition direction | Ratio of specific cell (%) |
|---|---|---|---|---|---|---|---|---|---|---|---|---|---|
| | | | | | Side 1 | Side 2 | Side 3 | Side 4 | Side 5 | Side 6 | | | |
| Comparative Example 6 | 3.5 | 400 | 62 | 35 | 2 | 2 | 2 | 2 | 2 | 2 | Hexagon | Same | 0 |
| Comparative Example 7 | 3.5 | 400 | 62 | 35 | 1 | 2 | 2 | 2 | 2 | 2 | Hexagon | Same | 100 |
| Example 14 | 3.5 | 400 | 62 | 35 | 1 | 2 | 2 | 2 | 2 | 2 | Hexagon | Change by 60° | 100 |
| Example 15 | 3.5 | 400 | 62 | 35 | 1 | 2 | 2 | 2 | 2 | 2 | Hexagon | Irregular | 100 |
| Example 16 | 3.5 | 400 | 62 | 35 | 1 | 2 | 1 | 2 | 1 | 2 | Hexagon | Irregular | 100 |
| Example 17 | 3.5 | 400 | 62 | 35 | 1 | 2 | 2 | 2 | 2 | 2 | Hexagon | Change by 60° | 10 |
| Example 18 | 3.5 | 400 | 62 | 35 | 1 | 2 | 2 | 2 | 2 | 2 | Hexagon | Change by 60° | 50 |

TABLE 4

| | HC emission increment [%] | Determination on LA-4 test | Erosion chipping amount [cc] | Erosion deterioration rate for each reference structure | Determination on erosion test | Pressure loss [kPa] | Ratio of pressure loss for each reference structure | Evaluation on pressure loss | Overall determination |
|---|---|---|---|---|---|---|---|---|---|
| Comparative Example 6 | 36 | Not acceptable | 1.50 | Reference structure 4 | — | 1.73 | Reference structure 4 | — | — |
| Comparative Example 7 | 30 | Good | 1.80 | 1.20 | NG | 1.70 | 0.98 | OK | Not acceptable |
| Example 14 | 32 | Good | 1.60 | 1.07 | OK | 1.70 | 0.98 | OK | Good |
| Example 15 | 31 | Good | 1.60 | 1.07 | OK | 1.70 | 0.98 | OK | Good |
| Example 16 | 29 | Good | 1.60 | 1.07 | OK | 1.67 | 0.97 | OK | Good |
| Example 17 | 34 | Good | 1.57 | 1.05 | OK | 1.73 | 1.00 | OK | Good |
| Example 18 | 33 | Good | 1.53 | 1.02 | OK | 1.72 | 0.99 | OK | Good |

(Result)

As shown in the above Tables 2 and 4, it is understood that the honeycomb structures of Examples 1 to 18 include the specific cells, as compared with the honeycomb structures of Comparative Examples 1, 3, 5, and 6 having no specific cells, and therefore the purification performance of the exhaust gas after the loading of the catalyst is high.

Furthermore, in the honeycomb structures of Examples 1 to 18, the disposition directions of the shapes of the cells including the protrusions in the specific cells are different in one specific cell and other specific cells other than the one specific cell. For this reason, as compared with the honeycomb structures of Comparative Examples 2, 4, and 7, the honeycomb structures of Examples 1 to 18 show that the result of the erosion test is good (determination "OK") and the abrasion resistance is maintained. In the honeycomb structures of Comparative Examples 2, 4, and 7, all the disposition directions of the shapes of the cells including the protrusions in the specific cells are the same.

The honeycomb structure of the present invention can be used as the catalyst carrier for the exhaust gas purification to purify the exhaust gas.

DESCRIPTION OF REFERENCE NUMERALS

1: Partition wall, 2: Cell, 2a, A, B, C, D: Specific cell, 2s: Reference cell, 10: Honeycomb structure body, 11: First end face, 12: Second end face, 20: Circumferential wall, 21: Protrusion, α: First side, β: Second side, γ: Third side, σ: Fourth side, 100: Honeycomb structure.

What is claimed is:

1. A honeycomb structure, comprising:
a pillar-shaped honeycomb structure body having a plurality of porous partition walls which are disposed to define a plurality of cells as fluid channels extending from a first end face to a second end face and a circumferential wall disposed to surround the plurality of porous partition walls,
wherein the plurality of porous partition walls are provided with protrusions which protrude to extend into the plurality of cells and are continuously disposed in an extending direction of the plurality of cells,
the plurality of cells have a polygonal shape in a cross section orthogonal to the extending direction of the plurality of cells,
the plurality of cells include a plurality of specific cells having at least one place where two sides each of which is provided with a different number of protrusions intersect each other,
in the cross section orthogonal to the extending direction of the plurality of specific cells, disposition directions of the shapes of the plurality of specific cells including the protrusions in the plurality of specific cells are different in one specific cell of the plurality of specific cells and other specific cells of the plurality of specific cells other than the one specific cell of the plurality of specific cells repeat in at least four specific cells of the plurality of specific cells directly adjacent to each other, and
when the plurality of specific cells exclude the protrusions the plurality of specific cells have a symmetric shape about a central axis orthogonal to each side of the specific cell of the plurality of specific cells, and when the plurality of specific cells include the protrusions the plurality of specific cells have an asymmetric shape about at least one central axis.

2. The honeycomb structure of claim 1, wherein in the plurality of specific cell, the number of protrusions disposed on each side is equal to or less than 3.

3. The honeycomb structure of claim 1, wherein in the cross section orthogonal to the extending direction of the plurality of cells, the plurality of specific cells are arranged in one direction, and in the one direction, variation in the disposition direction of the shape of the specific cell of the plurality of specific cells including the protrusion has regularity.

4. A honeycomb structure, comprising:
a pillar-shaped honeycomb structure body having a plurality of porous partition walls which are disposed to define a plurality of cells as fluid channels extending from a first end face to a second end face and a circumferential wall disposed to surround the plurality of porous partition walls,
wherein the plurality of porous partition walls are provided with protrusions which protrude to extend into the plurality of cells and are continuously disposed in an extending direction of the plurality of cells,
the plurality of cells have a polygonal shape in a cross section orthogonal to the extending direction of the plurality of cells,
the plurality of cells include a plurality of specific cells having at least one place where two sides each of which is provided with a different number of protrusions intersect each other,
in the cross section orthogonal to the extending direction of the plurality of cells, disposition directions of the shapes of the plurality of specific cells including the protrusions in the plurality of specific cells are different in one specific cell of the plurality of specific cells and other specific cells of the plurality of specific cells other than the one specific cell of the plurality of specific cells repeat in at least four specific cells of the plurality of specific cells directly adjacent to each other, and
in the cross section orthogonal to the extending direction of the plurality of cells, the plurality of specific cells are arranged in one direction, and in the one direction, variation in the disposition direction of the shape of the plurality of specific cells including the protrusions has irregularity, and
when the plurality of specific cells exclude the protrusions the plurality of specific cells have a symmetric shape about a central axis orthogonal to each side of the specific cell of the plurality of specific cells, and when the plurality of specific cells include the protrusions the plurality of specific cells have an asymmetric shape about at least one central axis.

* * * * *